United States Patent
Kozyrczak et al.

(10) Patent No.: US 8,117,202 B1
(45) Date of Patent: *Feb. 14, 2012

(54) USER SEGMENT POPULATION TECHNIQUES

(75) Inventors: Maciek Kozyrczak, Bothell, WA (US); Cheng Che Chen, Bellevue, WA (US); Basem Nayfeh, Mercer Island, WA (US)

(73) Assignee: AudienceScience Inc., Bellevue, WA (US)

( * ) Notice: Subject to any disclaimer, the term of this patent is extended or adjusted under 35 U.S.C. 154(b) by 217 days.

This patent is subject to a terminal disclaimer.

(21) Appl. No.: 12/640,900

(22) Filed: Dec. 17, 2009

Related U.S. Application Data

(63) Continuation of application No. 11/294,750, filed on Dec. 6, 2005, now Pat. No. 7,676,467, which is a continuation of application No. 11/107,405, filed on Apr. 14, 2005, now abandoned.

(51) Int. Cl.
*G06F 17/30* (2006.01)

(52) U.S. Cl. .................. 707/736; 707/749; 707/758

(58) Field of Classification Search .................. None
See application file for complete search history.

(56) References Cited

U.S. PATENT DOCUMENTS

| | | |
|---|---|---|
| 5,530,939 A | 6/1996 | Mansfield, Jr et al. |
| 5,721,831 A | 2/1998 | Waits et al. |
| 5,742,806 A | 4/1998 | Reiner et al. |
| 5,870,746 A | 2/1999 | Knutson et al. |
| 6,003,036 A | 12/1999 | Martin |
| 6,061,658 A | 5/2000 | Chou et al. |
| 6,078,891 A | 6/2000 | Riordan et al. |
| 6,112,186 A | 8/2000 | Bergh et al. |
| 6,272,472 B1 | 8/2001 | Danneels et al. |
| 6,374,263 B1 | 4/2002 | Bunger et al. |
| 6,377,993 B1 | 4/2002 | Brandt et al. |
| 6,430,539 B1 | 8/2002 | Lazarus et al. |
| 6,609,131 B1 | 8/2003 | Zait et al. |
| 6,615,258 B1 | 9/2003 | Barry et al. |
| 6,629,102 B1 | 9/2003 | Malloy et al. |
| 6,694,322 B2 | 2/2004 | Warren et al. |
| 6,785,666 B1 | 8/2004 | Nareddy et al. |
| 6,839,682 B1 | 1/2005 | Blume et al. |
| 6,873,981 B2 | 3/2005 | Nareddy et al. |
| 6,892,347 B1 | 5/2005 | Williams et al. |
| 6,917,972 B1 | 7/2005 | Basko et al. |
| 6,993,529 B1 | 1/2006 | Basko et al. |
| 7,003,476 B1 | 2/2006 | Samra et al. |
| 7,035,925 B1 | 4/2006 | Nareddy et al. |
| 7,107,338 B1 | 9/2006 | Nareddy et al. |
| 7,117,193 B1 | 10/2006 | Basko et al. |
| 7,120,666 B2 | 10/2006 | McCanne et al. |

(Continued)

OTHER PUBLICATIONS

U.S. Appl. No. 10/870,688, Kumar et al.

(Continued)

*Primary Examiner* — Debbie Le
(74) *Attorney, Agent, or Firm* — Perkins Coie LLP

(57) ABSTRACT

A facility for identifying users that have an interest in a selected subject is described. For each of a number of actual users, the facility establishes a user behavior record describing the behavior of the actual user. The facility also establishes a user behavior record describing behavior of a virtual user. The behavior described by the user behavior record for the virtual user is made up of actions each tending to indicate an interest in the selected subject. The facility identifies a proper subset of the actual users whose user behavior records are most similar to the user behavior record of the virtual user as interested in the selected subject.

27 Claims, 7 Drawing Sheets

U.S. PATENT DOCUMENTS

| | | | |
|---|---|---|---|
| 7,165,037 | B2 | 1/2007 | Lazarus et al. |
| 7,188,334 | B1 | 3/2007 | Sinclair |
| 7,231,612 | B1 | 6/2007 | Mani et al. |
| 7,370,342 | B2 | 5/2008 | Ismail et al. |
| 7,464,122 | B1 | 12/2008 | Basko et al. |
| 7,493,312 | B2 | 2/2009 | Liu et al. |
| 7,676,467 | B1 | 3/2010 | Kozyrczak et al. |
| 7,873,639 | B2 * | 1/2011 | Shipman ............ 707/737 |
| 7,873,648 | B2 * | 1/2011 | Jaepel et al. ......... 707/758 |
| 2002/0082901 | A1 | 6/2002 | Dunning et al. |
| 2002/0095421 | A1 | 7/2002 | Koskas |
| 2002/0099691 | A1 | 7/2002 | Lore et al. |
| 2002/0103792 | A1 * | 8/2002 | Blank et al. ............ 707/3 |
| 2003/0014304 | A1 | 1/2003 | Calvert et al. |
| 2003/0028509 | A1 | 2/2003 | Sah et al. |
| 2003/0074348 | A1 | 4/2003 | Sinclair et al. |
| 2003/0101451 | A1 | 5/2003 | Bentolila et al. |
| 2003/0163438 | A1 | 8/2003 | Barnett et al. |
| 2003/0204447 | A1 | 10/2003 | Dalzell et al. |
| 2003/0216966 | A1 | 11/2003 | Saenz et al. |
| 2004/0088376 | A1 | 5/2004 | McCanne et al. |
| 2004/0116783 | A1 | 6/2004 | Weaver |
| 2004/0172400 | A1 | 9/2004 | Zarom et al. |
| 2004/0181554 | A1 | 9/2004 | Heckerman et al. |
| 2004/0230947 | A1 | 11/2004 | Bales et al. |
| 2005/0015571 | A1 | 1/2005 | Kaufman et al. |
| 2005/0033771 | A1 | 2/2005 | Schmitter et al. |
| 2005/0086243 | A1 | 4/2005 | Abbott et al. |
| 2005/0159996 | A1 | 7/2005 | Lazarus et al. |
| 2005/0203888 | A1 | 9/2005 | Woosley et al. |
| 2005/0240468 | A1 | 10/2005 | Inman et al. |
| 2006/0041548 | A1 | 2/2006 | Parsons et al. |
| 2006/0069719 | A1 | 3/2006 | McCanne et al. |
| 2006/0112222 | A1 | 5/2006 | Barrall |
| 2006/0143684 | A1 | 6/2006 | Morris |
| 2006/0155605 | A1 | 7/2006 | Haighton et al. |
| 2006/0190333 | A1 | 8/2006 | Choi |
| 2006/0235764 | A1 | 10/2006 | Bamborough et al. |
| 2006/0277585 | A1 | 12/2006 | Error et al. |
| 2008/0097822 | A1 | 4/2008 | Schigel et al. |
| 2008/0189232 | A1 | 8/2008 | Dunning et al. |

OTHER PUBLICATIONS

Dainow, Brandt, "Defining Unique Visitors," iMedia Connection, 2 pages, Dec. 1, 2005.

"H", Microsoft® Computer Dictionary, Fifth Edition, 21 pages, May 2002.

Maurer, W. D. et al.. "Hash Table Methods," Computing Surveys, vol. 7, No. 1, pp. 5-19, Mar. 1975.

Novak, T. P. et al., "New Metrics for New Media: Toward the Development of Web Measurement Standards," World Wide Web Journal, vol. 2, No. 1, pp. 213-246, 1997.

ProQuest, "My Research," 5 pages, 2008.

Sen, Shahana et al., "On the Analysis of Web Site Usage Data: How Much Can we Learn About the Consumer From Web Logfiles?," Working Paper, 28 pages, 1998.

U.S. Appl. No. 10/870,688; Non-Final Office Action, 14 pages, Sep. 22, 2008.

Williamson, Debra Aho, "What Comes Before Search," The Wall Street Journal, 18 pages, Sep. 2004.

Wilson, R. Dale, "Using Web Traffic Analysis for Customer Acquisition and Retention Programs in Marketing," Services Marketing Quarterly, vol. 26, No. 2, 23 pages, 2004.

\* cited by examiner

FIG. 6 user behavior table ~600

| user id | action 1 - selected | action 2 - unselected | action 3 - unselected | action 4 - selected | action 5 - unselected |
|---------|---------------------|----------------------|----------------------|---------------------|----------------------|
| 1 | 10 | 1 | 2 | 11 | 6 |
| 2 | 11 | 0 | 1 | 12 | 0 |
| 3 | 10 | 0 | 15 | 11 | 0 |
| 4 | 10 | 13 | 4 | 11 | 5 |
| 5 | 26 | 15 | 27 | 0 | 32 |
| 6 | 0 | 6 | 7 | 23 | 4 |
| 7 | 10 | 13 | 4 | 11 | 5 |

FIG. 7

| user id | action 1 - S | action 2 - U | action 3 - U | action 4 - S | action 5 - U | total S | distinct S | distinct U | total U | rank |
|---|---|---|---|---|---|---|---|---|---|---|
| 5 | 26 | 15 | 27 | 0 | 32 | 26 | 1 | 3 | 74 | 1 |
| 2 | 11 | 0 | 1 | 12 | 0 | 23 | 2 | 1 | 1 | 2 |
| 6 | 0 | 6 | 7 | 23 | 4 | 23 | 1 | 3 | 17 | 3 |
| 3 | 10 | 0 | 15 | 11 | 0 | 21 | 2 | 1 | 15 | 4 |
| 1 | 10 | 1 | 2 | 11 | 6 | 21 | 2 | 3 | 9 | 5 |
| 7 | 10 | 13 | 4 | 11 | 5 | 21 | 2 | 3 | 22 | 6 |
| 4 | 10 | 13 | 4 | 11 | 5 | 21 | 2 | 3 | 22 | 7 | user ranking table

USER SEGMENT POPULATION TECHNIQUES

CROSS-REFERENCE TO RELATED APPLICATIONS

This application is a continuation of U.S. patent application Ser. No. 11/294,750, filed Dec. 6, 2005, issued on Mar. 9, 2010 as U.S. Pat. No. 7,676,467, which is a continuation of U.S. patent application Ser. No. 11/107,405, filed Apr. 14, 2005, now abandoned, which are hereby incorporated by reference in their entireties.

TECHNICAL FIELD

The described technology is directed to the field of analyzing user behavior.

BACKGROUND

The process of advertising involves presenting advertising messages for a cause, such as the purchase of a product or service, to people. Advertising messages can be presented via a variety of channels, including television, print periodicals, postal mail, billboards, web pages, and electronic mail.

Depending upon the type of channel used for particular advertising and the specific technology that supports that channel, advertising may be targeted at different levels to specific people or groups of people. For example, in some cases, advertising presented on web pages can be targeted to specific people or groups of people.

Targeting advertising to particular people can provide advantages, including (1) increasing the average level of relevancy of an advertising message to the people that receive it, (2) ensuring that the advertising message is seen by the people most likely to be receptive to it, and (3) reducing the total cost of advertising by reducing the number of people to whom the message is presented. One approach to targeting advertising is population segmentation, in which groups of people are created that have common characteristics, and that are likely to be receptive to advertising messages directed to particular subjects.

Conventional approaches to defining segments within a population of people begin by collecting a body of profile information about each person in the population, such as information characterizing the person's web browsing activity, as well as other demographic or biographical information for the person. A user builds a query against this profile information, which is executed to identify the people in the segment, referred to as "populating" the segment.

While such conventional approaches to defining segments can often be completely effective at selecting the people intended by the user defining the segment, they are often difficult to use. Such a user must understand all of the information available in the profiles, understand the set of tests available in the query engine, and understand how to assemble these into a query. This process often requires the use of a fairly involved user interface. As a result, such conventional approaches are typically used only by a small number of very sophisticated users, and are very seldom used by users—such as front-line marketing and advertising personnel—who have the greatest capacity to identify and refine characteristics likely to make a person receptive to a particular cause or advertising message.

In view of the shortcomings of conventional segment definition techniques, a new approach to segment definitions that enabled a larger group of users to more easily and/or more effectively define segments of users who are interested in a particular subject would have significant utility.

BRIEF DESCRIPTION OF THE DRAWINGS

FIG. 6 is a table diagram showing sample contents of a user behavior table documenting the behavior of a group of users.

FIG. 7 is a table diagram showing sample contents of a user ranking table generated by the facility in some embodiments based upon the contents of the user behavior table.

DETAILED DESCRIPTION

Figure 1:
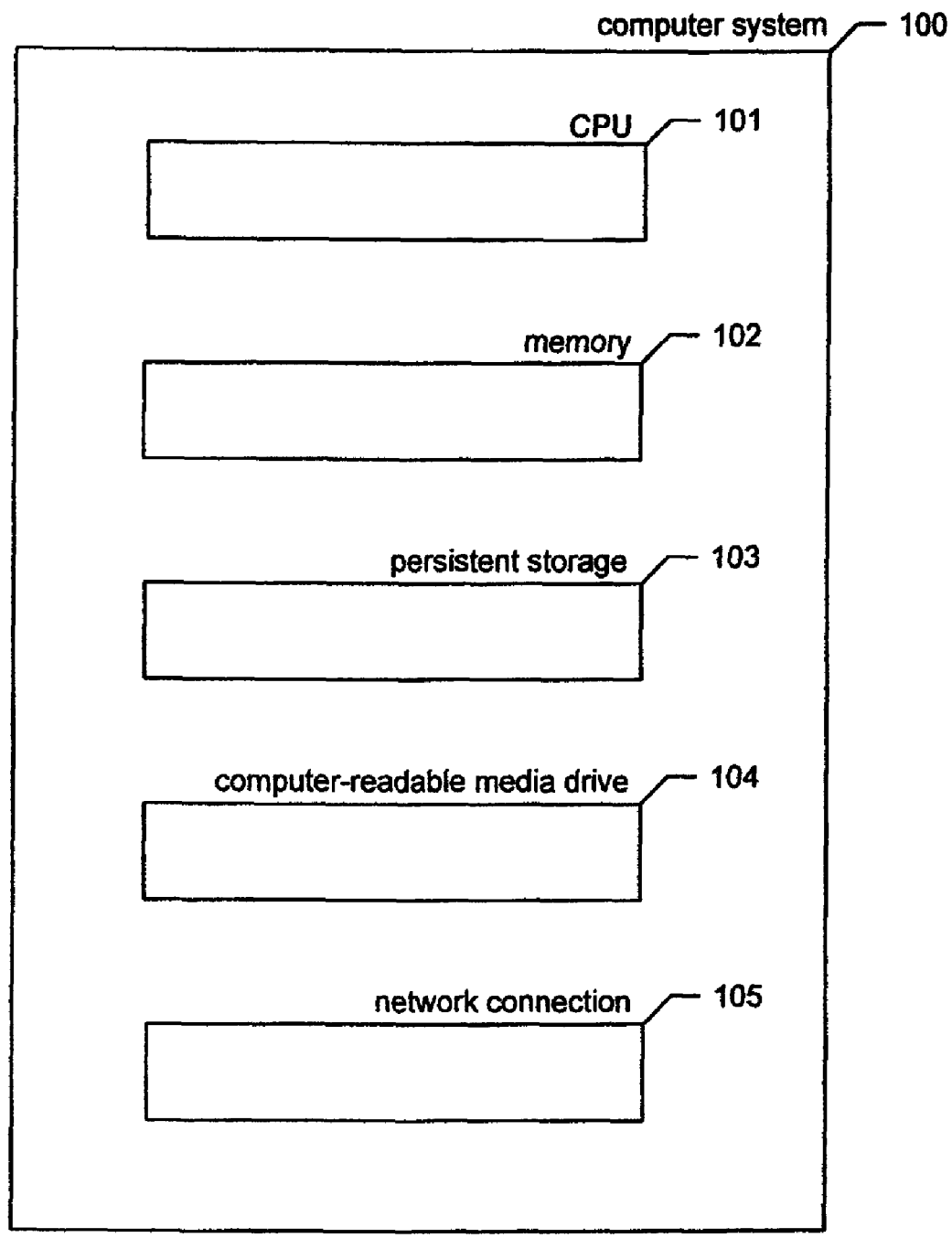
FIG. 1 is a block diagram showing some of the components typically incorporated in at least some of the computer systems and other devices on which the facility executes.

A facility for identifying users interested in a subject based upon their behavior ("the facility") is described. In some embodiments, the facility selects a set of available actions that together demonstrate a very high level of interest in the subject. As one example, where users are able to request pages from a particular web site, the facility searches the web site for pages containing query terms that relate to the subject. The facility then selects actions for requesting pages of the web site that appear in the search result as demonstrating a very high level of interest in the subject. The facility uses the selected set of actions to identify users interested in the subject based upon comparing the actions performed by the user to the selected set of actions.

In some embodiments, the facility attributes the selected set of actions to a "virtual user"—that is, in an environment that indicates for each of a number of actual users the set of actions performed by those users, the facility creates an artificial user that is indicated to have performed all of the selected actions. The facility then applies cohort matching techniques—such as item recommendation techniques, user correlation techniques, or autosegmentation techniques—to identify the actual users that are most similar to the virtual user based upon a comparison of the actions that they have performed. The facility identifies these users as being interested in the subject.

In some embodiments, the facility applies an approach in which it determines a ranking of users that reflects the users' relative level of interest in the subject. The most significant component of the ranking is the number of times that the user performed any selected action. For example, where two actions are selected by the facility, a first user who performed the first selected action 4 times would be ranked more highly than a second user who performed the first selected action once and the second selected action twice. For users that performed the same total number of selected actions, the facility ranks more highly users that performed a larger number of distinct selected actions. For example, a third user who performed the first selected action once and the second selected action once would be ranked more highly than a fourth user who performed the first selected action twice. For users that performed the same total number of selected actions and distinct selected actions, the facility ranks more highly users that performed a smaller number of distinct unselected actions. For example, a fifth user who performed the first selected action once, the second selected action once, and a first unselected action three times would be ranked more highly than a sixth user who performed the first selected action once, the second selected action once, the first unselected action once, and a second unselected action once. For users that performed the same total number of selected actions, distinct selected actions, and distinct unselected actions, the facility ranks more highly users that performed a smaller number of total unselected actions. For example, a seventh user who performed the first selected action once, the second selected action once, the first unselected action once, and the second unselected action once would be ranked more highly than a eight user who performed the first selected action once, the second selected action once, the first unselected action twice, and the second unselected action three times.

By identifying users interested in a subject in some or all of the ways described above, the facility enables advertisers for products and services related to the subject and other promoters for promotions relating to the subject to focus their resources on users who are likely to respond.

FIG. 1 is a block diagram showing some of the components typically incorporated in at least some of the computer systems and other devices on which the facility executes. These computer systems and devices 100 may include one or more central processing units ("CPUs") 101 for executing computer programs; a computer memory 102 for storing programs and data—including data structures—while they are being used; a persistent storage device 103, such as a hard drive, for persistently storing programs and data; a computer-readable media drive 104, such as a CD-ROM drive, for reading programs and data stored on a computer-readable medium; and a network connection 105 for connecting the computer system to other computer systems, such as via the Internet, to exchange programs and/or data—including data structures. While computer systems configured as described above are typically used to support the operation of the facility, one of ordinary skill in the art will appreciate that the facility may be implemented using devices of various types and configurations, and having various components.

While various embodiments are described in terms of the environment described above, those skilled in the art will appreciate that the facility may be implemented in a variety of other environments including a single, monolithic computer system, as well as various other combinations of computer systems or similar devices connected in various ways.

Figure 2:
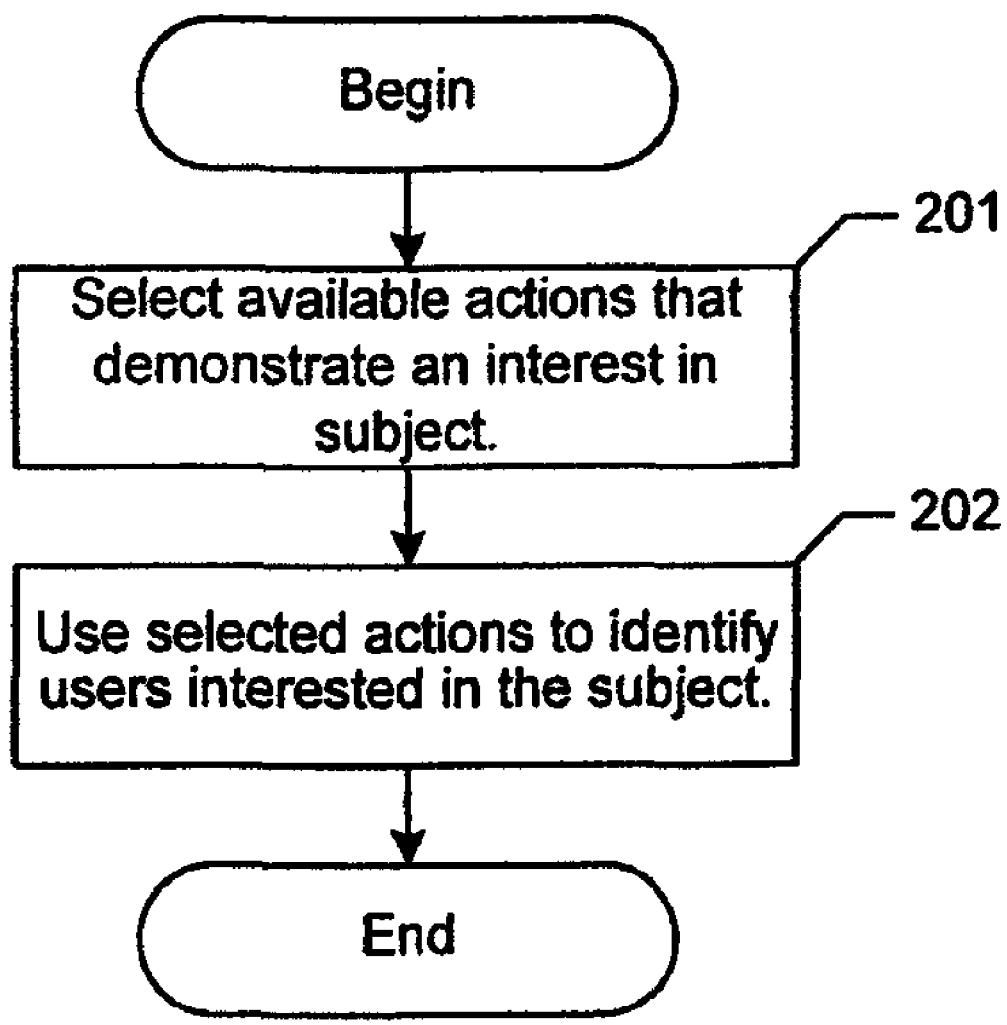
FIG. 2 is a flow diagram showing steps typically performed by the facility in order to identify users having an interest in the subject.

FIG. 2 is a flow diagram showing steps typically performed by the facility in order to identify users having an interest in the subject. In step 201, from a universe of available actions, the facility selects a set of actions that demonstrate an interest in the subject when performed by the user. For example, where users are able to request pages from a web site, the facility may select request actions for particular pages relating to the subject in step 201. For example, the facility may identify these pages by searching for pages of the web site that contain query terms that relate to the subject. In some embodiments, the facility considers other kinds of web browsing actions, such as using a mortgage calculator or automobile configurer, entering certain information into a form, selecting a particular user interface control displayed on a web page, etc. In some embodiments, the facility considers other types of user behavior actions, such as actions involved in watching television or other video sequences, listening to radio or other audio sequences, renting or going to movies, etc. In various embodiments, the facility uses techniques such as those described in the following two patent applications, each of which is hereby incorporated by reference in its entirety: U.S. patent application Ser. No. 10/859,442, filed on Jun. 1, 2004, and U.S. patent application Ser. No. 11/048,985 filed on Feb. 1, 2005. In step 202, as described in further detail below, the facility uses the actions selected in step 201 to identify users interested in the subject. After step 202, these steps conclude.

Those skilled in the art will appreciate that the steps shown in FIG. 2 and in each of the flow diagrams discussed below may be altered in a variety of ways. For example, the order of the steps may be rearranged; substeps may be performed in parallel; shown steps may be omitted, or other steps may be included; etc.

Figure 3:
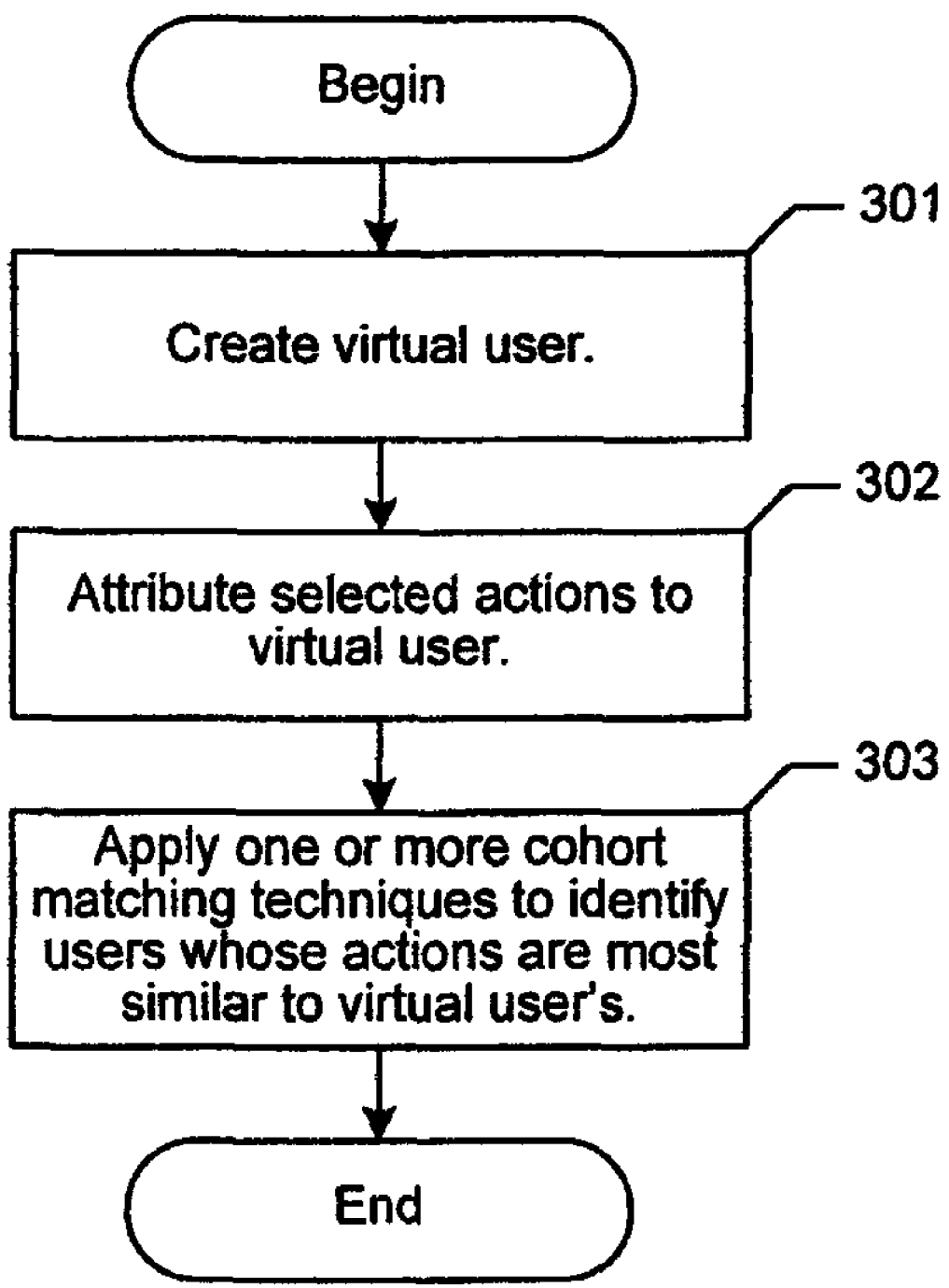
FIG. 3 is a flow diagram showing steps typically performed by the facility to identify users interested in the subject based upon the set of selected actions.
Figure 4:
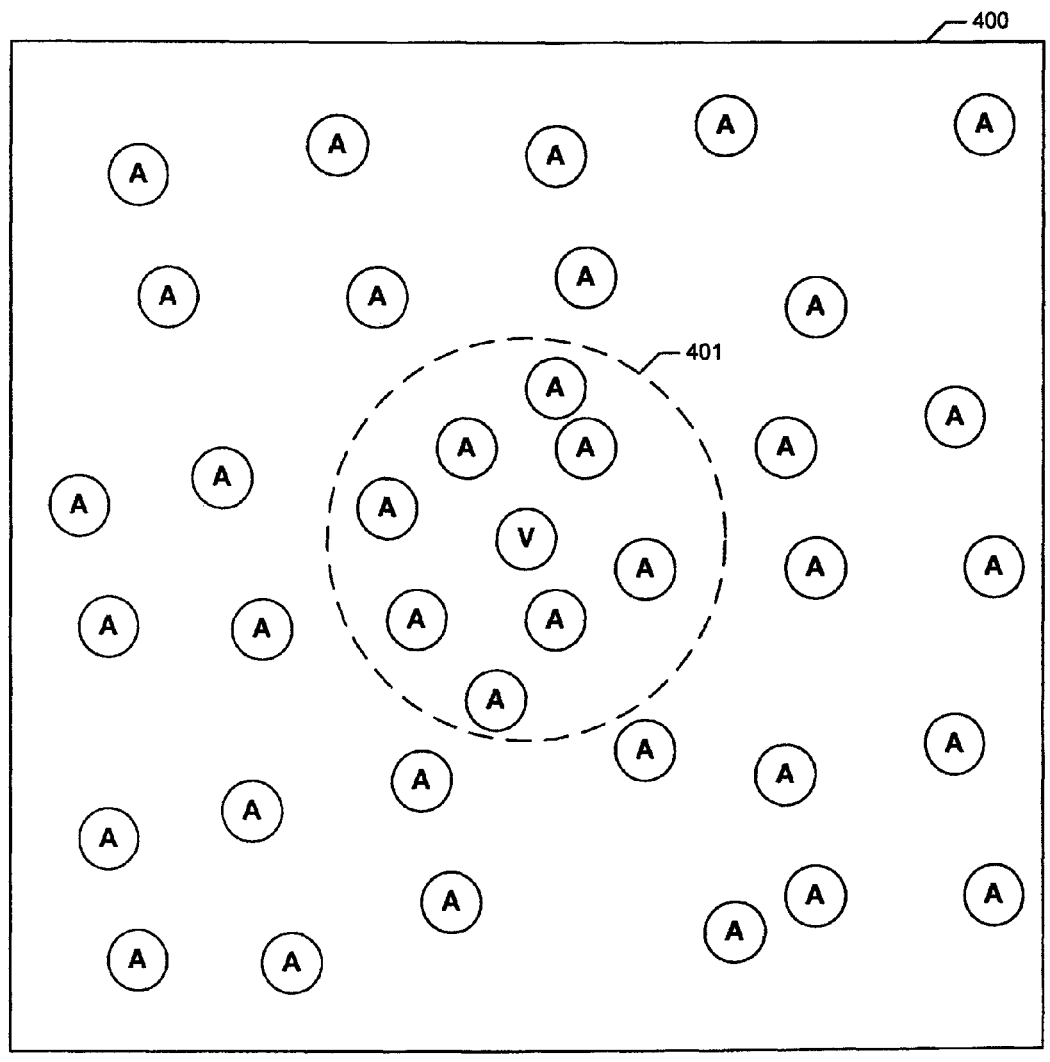
FIG. 4 is a conceptual diagram showing an example of identifying users whose actions are most similar to the virtual user's actions using a cohort-matching technique.

FIGS. 3 and 4 show a "virtual user" approach to identify users interested in the subject based upon the set of selected actions. FIG. 3 is a flow diagram showing steps typically performed by the facility to identify users interested in the subject based upon the set of selected actions. In step 301, the facility creates a virtual user by creating an indication of a new user. In step 302, the facility attributes the actions selected in step 201 to the virtual user created in step 301. In step 303, the facility applies one or more cohort-matching techniques to identify users whose actions are most similar to those of the virtual user. In various embodiments, the facility uses cohort-matching techniques in step 303 such as item recommendation techniques, user correlation techniques, or auto-segmentation techniques. As one example, the techniques described in U.S. Pat. Ser. No. 09/629,252, filed on Jul. 27, 2000, which is hereby incorporated by reference in its entirety, may be used. After step 303, these steps conclude.

FIG. 4 is a conceptual diagram showing an example of identifying users whose actions are most similar to the virtual users actions using a cohort-matching technique. The diagram shows a behavior universe 400 containing indications of each monitored user's behavior. The indications for actual users are shown as circled As. The indication of the virtual user is shown as a circled V. Those skilled in the art will appreciate that a user's behavior may vary in a number of dimensions that is much larger than the two dimensions that are available to illustrate in the diagram. It can be seen that a behavior indication of actual users occur at varying distances from the behavior indication of the virtual user. The facility selects a subset 401 of the actual users whose behavior is the closest to that of the virtual user, and identifies these actual users as being interested in the subject. In various embodiments, the facility uses a variety of techniques to select the subset of actual users, such as choosing a radius about the virtual user that contains a predetermined percentage of the actual users; describing a non-circular region about the virtual user that contains a predetermined percentage of the actual users; selecting a "cluster" of actual users about the virtual user that is separated from the unselected actual users by a certain amount of unoccupied margin space; etc.

The facility uses a variety of approaches to determining distances between the virtual user and each actual user. In some embodiments, the facility applies a linear correlation approach. For each actual user, the number of actions performed by neither the virtual user nor the actual user—associated by the facility with the point (0, 0); the number of actions performed by the virtual user, but not the actual user—associated by the facility with the point (1, 0); the number of actions performed by the actual user but not the virtual user—associated by the facility with the point (0, 1); and the number of actions performed by both the virtual user and the actual user—associated by the facility with the point (1, 1). The facility applies each of these values as a weight to the corresponding point, and determines a linear least-squares estimator that includes both a mean value and a variance value. The facility then computes a single score or rank that, as a first matter, values a high mean, and, as second matter, values a low variance.

In some embodiments, the facility uses a relative entropy approach by determining the Kullback-Leibler distance d from a distribution of the virtual user's actions $q_k$ to a distribution of the actual user's actions $p_k$:

$$d = \sum_k p_k \log_2\left(\frac{p_k}{q_k}\right) \quad (1)$$

Those skilled in the art will appreciate that the facility could use a number of other such approaches.

Figure 5:
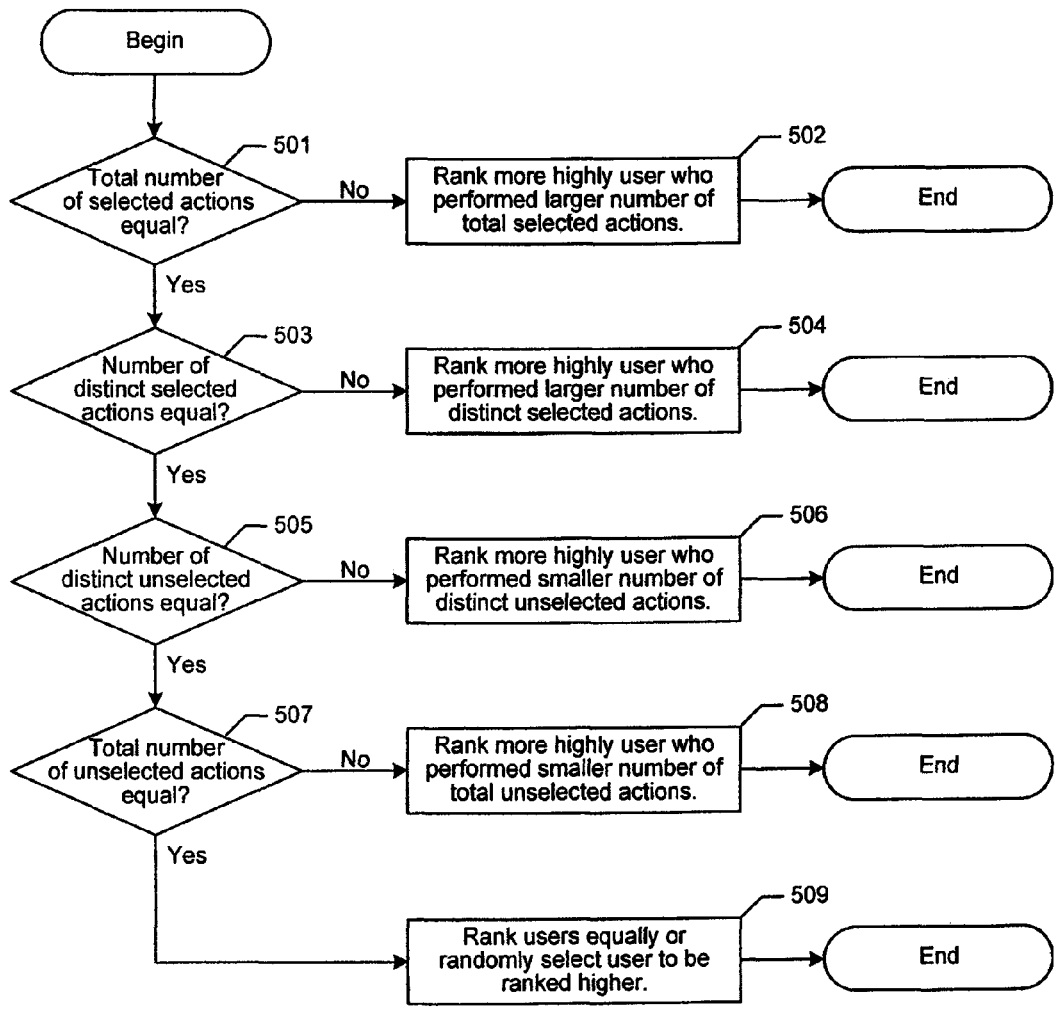
FIG. 5 is a flow diagram showing steps typically performed by the facility in order to determine a ranking of users that reflects the user's relative level of interest in the subject, from which users interested in the subject can be identified.

FIGS. 5-7 illustrate the approach of determining a ranking of users that reflects the user's relative level of interest in the subject. FIG. 5 is a flow diagram showing steps typically performed by the facility in order to determine a ranking of users that reflects the user's relative level of interest in the subject, from which users interested in the subject can be identified. In some embodiments, the facility applies the steps shown in FIG. 5 to each pair of users in order to determine which user of the pair should be more highly ranked. In step 501, if the total number of selected actions performed by the two users is equal, then the facility continues in step 503, else the facility continues in step 502. In step 502, the facility ranks more highly the user who performed a larger number of total selected actions. Step 502 is based upon the observation that a greater level of interest in a subject causes a user to perform a greater number of total actions that relate to that subject. After step 502, these steps conclude.

In step 503, if the number of distinct selected actions performed by the two users is equal, then the facility continues in step 505, else the facility continues in step 504. In step 504, the facility ranks more highly the user who performed the larger number of distinct selected actions. Step 504 is based upon the observation that among users who have performed the same total number of actions related to a subject, the user who has performed more distinct actions relating to the subject tends to be more interested in the subject than users that repeat a smaller number of such actions a larger number of times. After step 504, these steps conclude.

In step 505, if the number of distinct unselected actions performed by the two users is equal, then the facility continues in step 507, else the facility continues in step 506. In step 506, the facility ranks more highly the user who performed a smaller number of distinct unselected actions. Step 506 is based upon the observation that, where a user has a higher level of interest in a subject, a higher percentage of all of the user's discrete actions relate to the subject. After step 506, these steps conclude.

In step 507, if the total number of unselected actions performed by the two users is equal, then the facility continues in step 509, else the facility continues in step 508. In step 508, the facility ranks more highly the user who performed a smaller number of total unselected actions. Step 508 is based upon the observation that, where a user has a higher level of interest in a subject, a higher percentage of all of the user's total actions relate to the subject. After step 508, these steps conclude.

In step 509, the facility ranks the users equally, or randomly selects a user to be ranked higher, or uses some other basis to rank the two users relative to one another (not shown). After step 509, these steps conclude.

An example of the process shown in FIG. 5 is illustrated in FIGS. 6 and 7.

FIG. 6 is a table diagram showing sample contents of a user behavior table documenting the behavior of a group of users. The table 600 is comprised of rows such as rows 601-607, each corresponding to a different user. Each row is divided into the following columns: a user ID column 611 containing a unique identifier for the user; an action 1 column 612 showing the number of times that the user has performed a first action, which has been selected as relevant to the subject; an action 2 column 613 showing the number of times that the user has performed a second action that has not been selected as being relevant to the subject; an action 3 column 614 showing the number of times that the user has performed a third action that has not been selected as being relevant to the subject; an action 4 column 615 showing the number of times that the user has performed a fourth action, which has been selected as relevant to the subject; and an action 5 column 616 showing the number of times that the user has performed a fifth action that has not been selected as being relevant to the subject. For example, row 601 shows that a user having user ID 1 performed selected action 1 ten times, performed unselected action 2 one time, performed unselected action 3 two times, performed selected action 4 eleven times, and performed unselected action 5 six times.

While FIG. 6 and each of the table diagrams discussed below show a table whose contents and organization are designed to make them more comprehensible by a human reader, those skilled in the art will appreciate that actual data structures used by the facility to store this information may differ from the table shown, in that they, for example, may be organized in a different manner; may contain more or less information than shown; may be compressed and/or encrypted; etc.

FIG. 7 is a table diagram showing sample contents of a user ranking table generated by the facility in some embodiments based upon the contents of the user behavior table. The user ranking table 700 is made up of rows, such as rows 701-707, each corresponding to a different user. Columns 711-716 contain user behavior information and correspond to columns 611-616 of the user behavior table. Columns 721-724 contain metrics derived from the user behavior information that the facility uses to determine the ranking. Ranking column 731 reflects a ranking determined by the facility that indicates the relative level of interest of these users in the subject, where a lower ranking value reflects a higher rank (e.g., the rank value 1 shown in row 701 reflects the highest rank).

Total selected column 721 indicates the total number of times the user performed any selected action—here the sum of the contents of columns 712 and 714, containing the total number of times each user performed selected actions 1 and 4, respectively. For example, in row 702, it can be seen that the user having user ID 2 performed action 1 eleven times and action 4 twelve times, for a total of twenty-three in column 721. Distinct selected column 722 contains an indication of the number of selected actions that a user performed at least one time. For example, in row 702, it can be seen that the user having user ID 2 performed both of the two selected actions one and four at least once, and therefore has the value 2 in distinct selected column 722. Distinct unselected column 723 indicates the number of unselected actions the user performed at least once. For example, in row 702, it can be seen that the user having user ID 2 performed only one of the three unselected actions (action 3, but not action 2 or action 5) one or more times. Accordingly, column 723 contains the value 1. The total unselected column 724 indicates the total number of times the user performed any unselected action—here the sum of the contents of columns 713, 714, and 716. In row 703, it can be seen that the user having user ID 6 performed unselected action 2 six times, unselected action 3 seven times, and unselected action 5 four times for a total of seventeen in column 724.

Using the steps shown in FIG. 5, the facility determines the contents of rank column 731. It can be seen in column 721 that row 701 has the highest number of total selected actions, twenty-six. Accordingly, it receives the highest rank. It can be seen that rows 702 and 703 both have the same second-highest total number of selected actions, twenty-three. Accordingly, each of these rows will be ranked either second or third. Row 702 is ranked second based upon having a higher number of distinct selected actions, two, than row 703, one. Rows 704-707 all have the same total number of selected actions, twenty-one, and number of distinct selected actions twenty-two. Because row 704 has a smaller number of distinct unselected actions, one, than rows 705-707, it is ranked higher than rows 705-707. Rows 705-707 all have the same number of total selected actions, distinct selected actions, and distinct unselected actions, so they are further differentiated based upon total number of unselected actions. Because row 705 has the smallest number of total unselected actions among these three rows, nine, it is ranked fifth. Rows 706-707 have the same number of total selected actions, distinct selected actions, distinct unselected actions, and total unselected actions, and are therefore ranked the same, sixth. In some embodiments, the facility employs some other basis for performing a relative ranking of these rows, such as random selection.

In some embodiments, the facility selects a subset of the rows of these or ranking table starting at the highest rank and extending to some lower rank. In some embodiments, a predetermined percentage of the rows are selected. In some embodiments, the facility uses a variety of other selection techniques to identify users interested in the subject.

In some embodiments, the facility performs the ranking in ways that differ from the approach described above. In some embodiments, the facility omits or combines factors among the four factors described. In some embodiments, rather than comparing each pair of users to determine their relative ranking, the facility independently determines a numerical score for each user. In some embodiments, the facility uses a multiple digit number for the score, and allocates one or more of the lowest-order digits of the number to the least significant factor, allocates one or more of the next most significant digits to the next most significant factor, and so on. For example, for user having user ID 3 shown in row 704 FIG. 7, the facility may determine the score 21029884, where the "21" is copied from column 721, the "02" is copied from column 722, the "98" is determined by subtracting the value 1 contained in column 723 from 99, and the "84" is determined by subtracting the value 15 contained in column 724 from 99. In some embodiments, the facility uses other encoding schemes to generate a numerical score for each user that leads to the same or a similar relative ranking result.

After the facility has identified users interested in the subject, advertisements or other promotions relating to the subject may be targeted to the identified users. In some embodiments, the facility uses advertising or other promotion techniques described in U.S. patent application Ser. No. 11/087,378, filed on Mar. 22, 2005, which is hereby incorporated by reference in its entirety. In some embodiments, the operator of the facility directly uses the list of identified users to itself target advertisements or other promotions to the identified users. In some embodiments, the operator of the facility sells a list of the identified users for use by other advertisers or promoters. In some embodiments, the facility uses techniques described in the following two patent applications, each of which is hereby incorporated by reference in its entirety: U.S. Patent Application No. 60/626,576, filed on Nov. 9, 2004, and U.S. Patent Application No. 60/623,379, filed on Oct. 29, 2004.

It will be appreciated by those skilled in the art that the above-described facility may be straightforwardly adapted or extended in various ways. For example, the facility may be used to identify users in a wide variety of subjects, based upon a wide variety of different types of actions, in support of a wide variety of promotion techniques. While the foregoing description makes reference to particular embodiments, the scope of the invention is defined solely by the claims that follow and the elements recited therein.

We claim:

1. A method in a computing system for identifying users among a plurality of users that have an interest in a selected subject, comprising:
for each of a plurality of actual users, establishing a user behavior record describing behavior of the actual user;
establishing a user behavior record describing behavior of a virtual user, the behavior described by the user behavior record for the virtual user comprising actions each tending to indicate an interest in the selected subject; and
identifying as interested in the selected subject a proper subset of the plurality of actual users whose user behavior records are most similar to the user behavior record established for the virtual user.

2. The method of claim 1, further comprising presenting an advertising message relating to the selected subject to the identified users.

3. The method of claim 1 wherein the behavior described by the user behavior record established for the virtual user comprises web-browsing actions.

4. The method of claim 1 wherein the behavior described by the user behavior record established for the virtual user comprises web page retrieval actions.

5. The method of claim 4, further comprising selecting the actions comprising the behavior described by the user behavior record for the virtual user by searching for web pages that contain query terms relating to the selected subject.

6. The method of claim 1 wherein the identification is performed by applying a cohort matching technique to the user behavior records for the actual users and the virtual user.

7. The method of claim 6 wherein the applied cohort matching technique is item recommendations.

8. The method of claim 6 wherein the applied cohort matching technique is user correlation.

9. The method of claim 6 wherein the applied cohort matching technique is automatic segmentation.

10. The method of claim 6 wherein the applied cohort matching technique is auto-clustering.

11. The method of claim 6 wherein the applied cohort matching technique comprises:
determining, for each of the user behavior records established for an actual user, a distance between (a) the behavior described by user behavior records established for the actual user and (b) the behavior described by user behavior records established for the virtual user; and
identifying users among the plurality of actual users having the smallest distances from the virtual user.

12. One or more computer memories collectively containing a user behavior data structure, comprising:
    for each of a plurality of actual users, a user behavior record describing behavior of the actual user; and
    a user behavior record describing behavior of a virtual user, the behavior described by the user behavior record for the virtual user comprising actions each tending to indicate an interest in a selected subject,
the contents of the data structure being adapted to use by a cohort matching technique to select the users of the plurality of actual users whose behavior is most similar to that of the virtual user and identify the selected users as interested in the selected subject.

13. The method of claim 12 wherein the behavior described by the user behavior record for the virtual user comprises web-browsing actions.

14. The method of claim 12 wherein the behavior described by the user behavior record for the virtual user includes text selection actions.

15. The method of claim 12 wherein the behavior described by the user behavior record for the virtual user includes text reading actions.

16. The method of claim 12 wherein the behavior described by the user behavior record for the virtual user includes video selection actions.

17. The method of claim 12 wherein the behavior described by the user behavior record for the virtual user includes video watching actions.

18. The method of claim 12 wherein the behavior described by the user behavior record for the virtual user includes audio selection actions.

19. The method of claim 12 wherein the behavior described by the user behavior record for the virtual user includes audio listening actions.

20. A computer-readable storage medium whose contents cause a computing system to perform a method for determining a relative ranking of users among a plurality of users indicating the extent to which each user is interested in a selected subject, the method comprising:
    among a plurality of available actions, selecting a proper subset of actions whose performance reflects interest in the selected subject;
    for each user of the plurality, determining (a) the number of total selected actions performed by the user, (b) the number of distinct selected actions performed by the user, (c) the number of distinct unselected actions performed by the user, and (d) the number of total unselected actions performed by the user; and
    determining a relative ranking of the plurality of users that reflects the determination of (a)-(d) for each user.

21. The computer-readable storage medium of claim 20 wherein the determined ranking (1) favors users who performed a higher number of total selected actions; (2) among users who performed the same number of total selected actions, favors users who performed a higher number of distinct selected actions; (3) among users who performed the same number of total selected actions and distinct selected actions, favors users who performed a lower number of distinct unselected actions; and (4) among users who performed the same number of total selected actions, distinct selected actions, and distinct unselected actions, favors users who performed a lower number of total unselected actions.

22. The computer-readable storage medium of claim 20, the method further comprising selecting a proper subset of the plurality of users as being most interested in the selected subject.

23. The computer-readable storage medium of claim 22, the method further comprising presenting an advertising message relating to the selected subject to the identified users.

24. The computer-readable storage medium of claim 20 wherein at least a portion of the selected actions are requesting a particular web page among a plurality of web pages.

25. The computer-readable storage medium of claim 20, the method further comprising:
    searching the plurality of web pages to identify those that contain keywords relating to the selected subject, and
    for each of the identified web pages, selecting the action of retrieving the identified web page.

26. A computing system having a processor that determines a relative ranking of users among a plurality of users indicating the extent to which each user is interested in a selected subject, comprising:
    an action selection system that selects, among a plurality of available actions, a proper subset of actions whose performance reflects interest in the selected subject;
    a user behavior analysis subsystem that determines, for each user of the plurality, (a) the number of total selected actions performed by the user, (b) the number of distinct selected actions performed by the user, (c) the number of distinct unselected actions performed by the user, and (d) the number of total unselected actions performed by the user; and
    a user ranking subsystem that determines, with the processor, a relative ranking of the plurality of users that reflects the determination of (a)-(d) for each user.

27. The computing system of claim 26 wherein the determined ranking (1) favors users who performed a higher number of total selected actions; (2) among users who performed the same number of total selected actions, favors users who performed a higher number of distinct selected actions; (3) among users who performed the same number of total selected actions and distinct selected actions, favors users who performed a lower number of distinct unselected actions; and (4) among users who performed the same number of total selected actions, distinct selected actions, and distinct unselected actions, favors users who performed a lower number of total unselected actions.

* * * * *